(12) United States Patent
Naman

(10) Patent No.: US 6,822,354 B2
(45) Date of Patent: Nov. 23, 2004

(54) ELECTRIC MOTOR

(75) Inventor: Robert Naman, La Wantzenau (FR)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/249,395

(22) Filed: Apr. 4, 2003

(65) Prior Publication Data
US 2004/0195927 A1 Oct. 7, 2004

(51) Int. Cl.$^7$ .............................................. H02K 11/00
(52) U.S. Cl. ...................................................... 310/68 C
(58) Field of Search ............................... 310/68 C, 233, 310/231, 232, 68 R, 248; 29/596–598

(56) References Cited

U.S. PATENT DOCUMENTS

| | | | |
|---|---|---|---|
| 2,189,996 A | | 2/1940 | Riche ........................ 200/713 |
| 2,414,531 A | | 1/1947 | Johns ........................ 200/722 |
| 3,127,531 A | | 3/1964 | Tothero ..................... 310/68 C |
| 3,131,322 A | | 4/1964 | Pleiss, Jr. et al. .......... 310/68 C |
| 3,842,297 A | | 10/1974 | Pleiss, Jr. et al. .......... 310/68 C |
| 3,912,956 A | | 10/1975 | Muller ....................... 310/68 C |
| 4,132,913 A | * | 1/1979 | Lautner et al. ............. 310/68 C |
| 4,293,789 A | | 10/1981 | King ......................... 310/68 C |
| 4,890,050 A | | 12/1989 | Mackevich ................. 322/34 |
| 5,041,751 A | | 8/1991 | Yokozuka ................... 310/239 |
| 5,089,735 A | | 2/1992 | Sawaguchi et al. .......... 310/88 |
| 5,140,205 A | | 8/1992 | Baines ....................... 310/68 C |
| 5,770,901 A | | 6/1998 | Niimi et al. ................. 310/52 |
| 5,929,948 A | * | 7/1999 | Ohori et al. ................. 349/44 |
| 6,329,732 B1 | | 12/2001 | Straley ....................... 29/596 |
| 6,384,497 B1 | | 5/2002 | Berray et al. .............. 310/68 C |
| 6,452,297 B2 | * | 9/2002 | Yamamoto et al. .......... 310/89 |
| 6,653,754 B2 | * | 11/2003 | Uchida et al. ............... 310/51 |
| 6,677,693 B2 | * | 1/2004 | Ooyama ..................... 310/239 |

FOREIGN PATENT DOCUMENTS

JP 57049346 * 3/1982 ............... 310/68 C

* cited by examiner

Primary Examiner—Dang Le
Assistant Examiner—Leda Pham
(74) Attorney, Agent, or Firm—Michael Best & Friedrich LLP

(57) ABSTRACT

In one embodiment, the invention provides an electric motor including an armature, a stator, and brushes. The armature includes an armature winding and a commutator connected to the armature winding. The stator is disposed to magnetically interact with the armature. The brushes are disposed to engage with the commutator to controllably provide electric current to the windings via the commutator. The electric motor further includes an inductor (e.g., a wire-wound inductor) electrically connected in a series relationship with at least one of the brushes and a thermal cutoff device electrically connected in a series relationship with the inductor. The thermal cutoff device is disposed within at least a portion of the inductor.

21 Claims, 5 Drawing Sheets

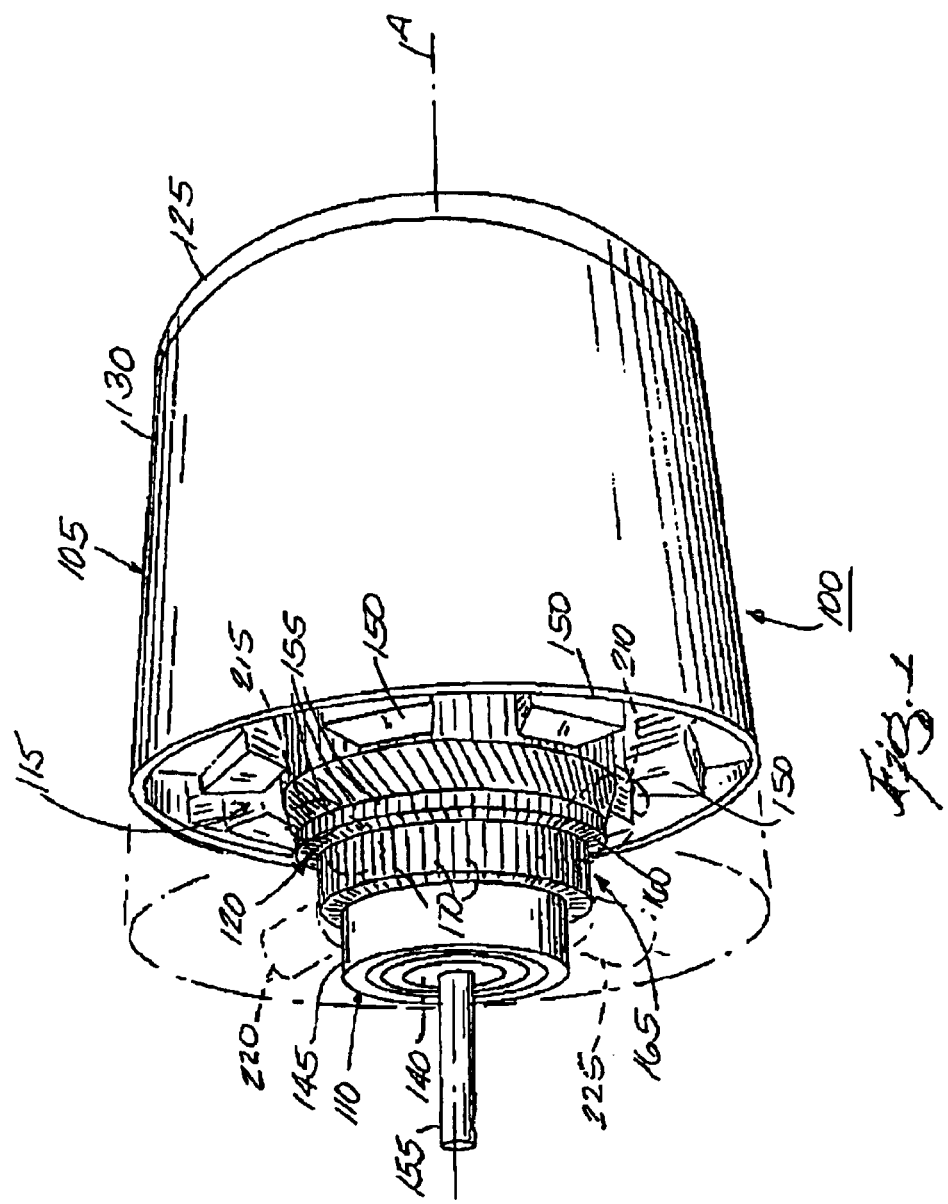

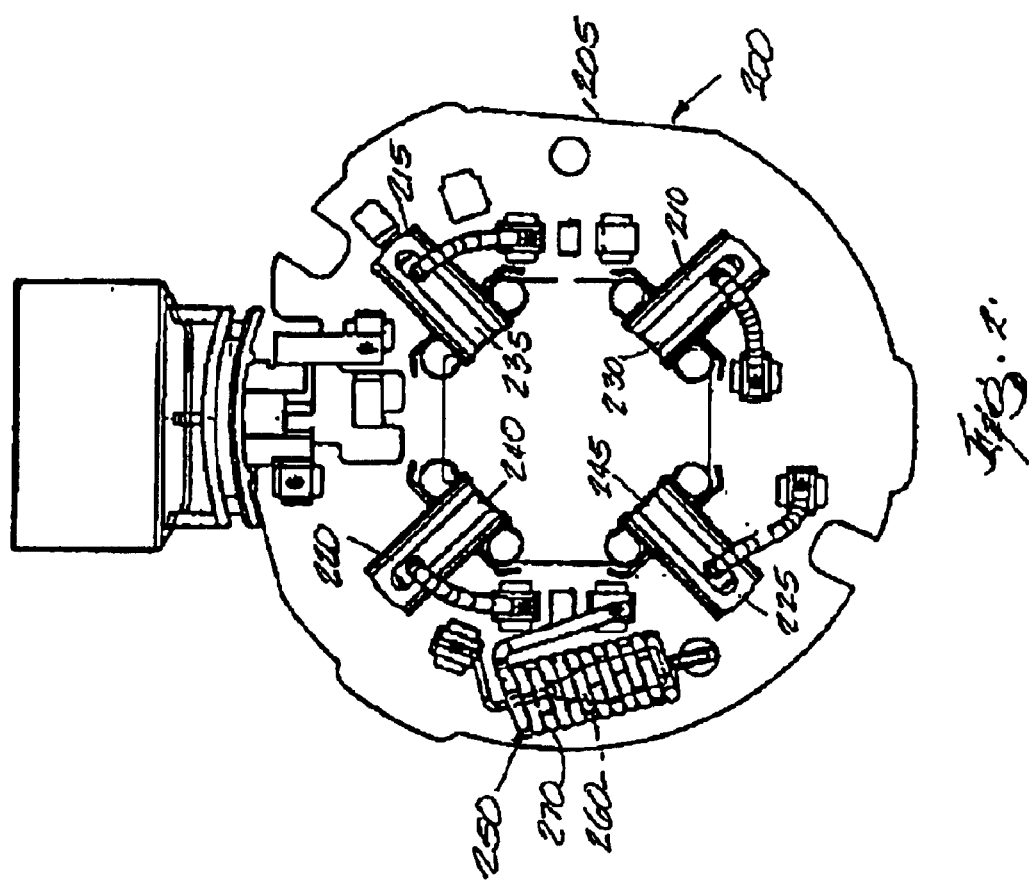

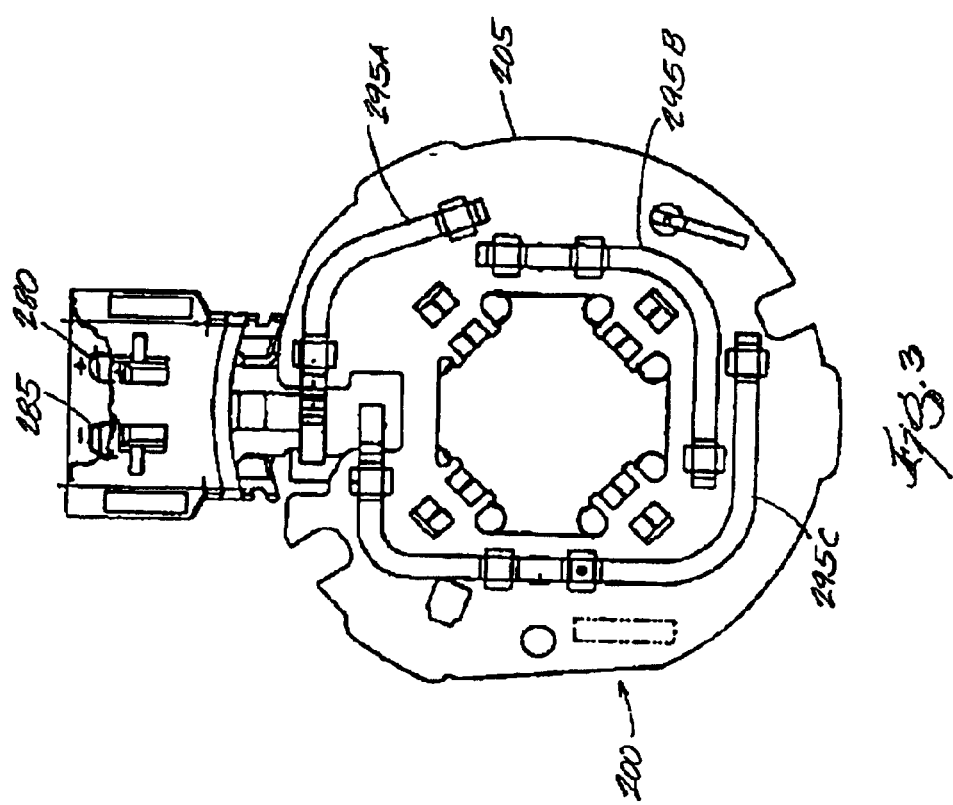

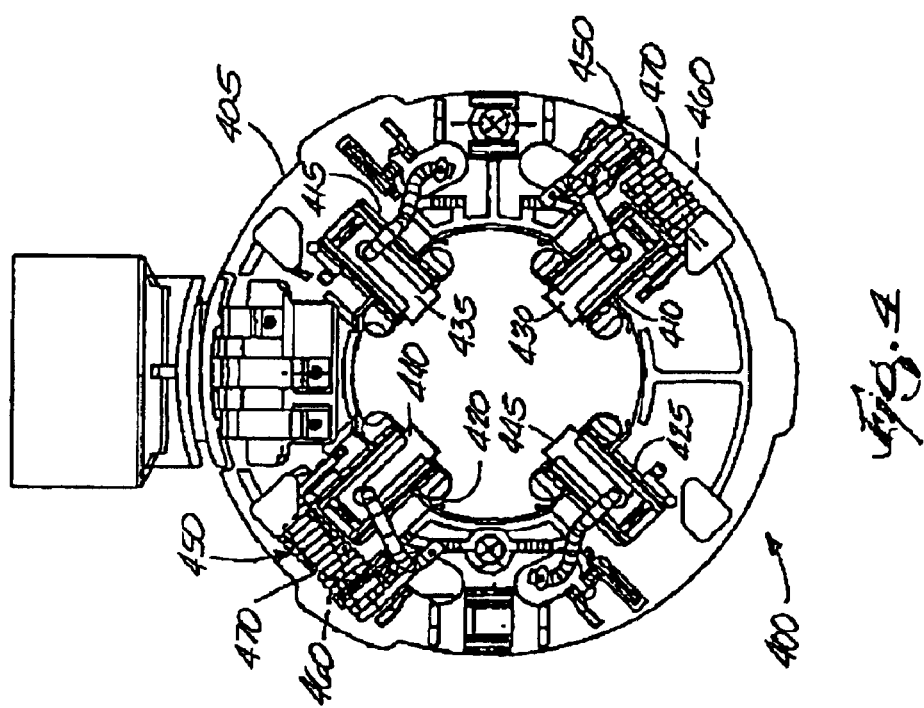

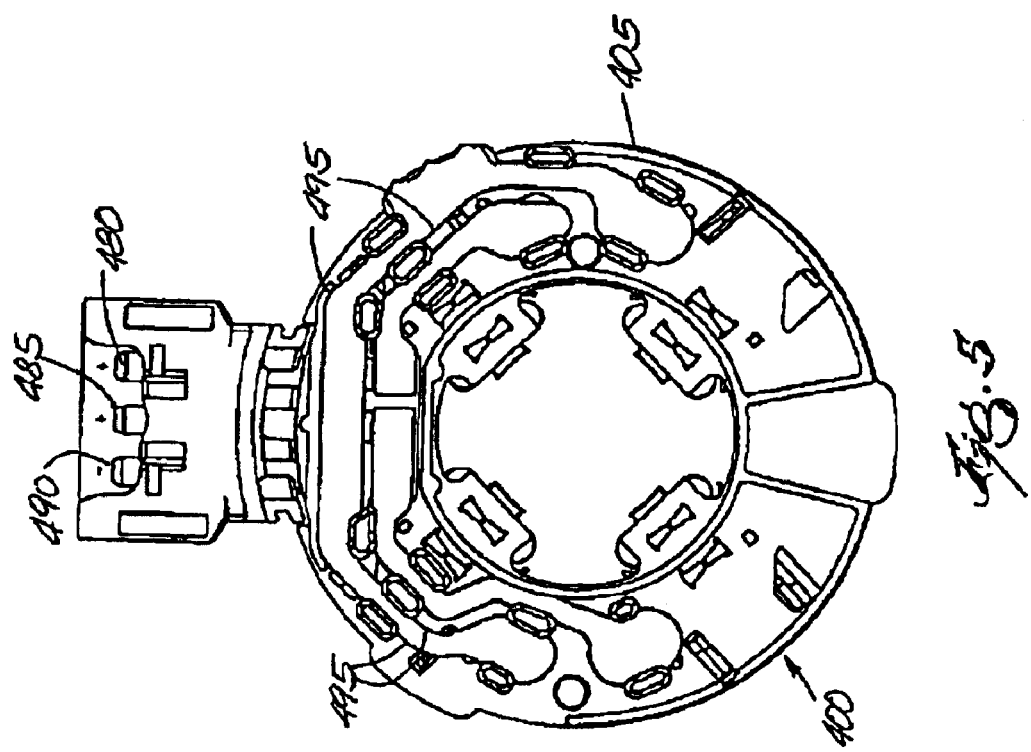

US 6,822,354 B2

ELECTRIC MOTOR

BACKGROUND OF INVENTION

The present invention relates to an electric motor and, particularly, to a brush electric motor.

Brush electric motors are used in many environments. One example environment is the cooling system of an automobile. For a specific example, a brush electric motor can be used to power and control the movement of a cooling fan for the engine of the automobile. For such an environment, if the fan locks (e.g., a foreign object prevents movement of the fan), a closed-circuit condition can occur in the armature of the motor, thereby resulting in the motor overheating. The overheating of the motor may cause damage to the motor and, possibly, the surrounding environment. It would be beneficial to have a self-contained solution for deactivating the brush motor when the brush motor overheats due to a lock condition.

SUMMARY OF INVENTION

In one embodiment, the invention provides an electric motor including an armature, a stator, and a plurality of brushes. The armature includes an armature winding and a commutator connected to the armature winding. The stator is disposed to magnetically interact with the armature. The brushes are disposed to frictionally engage with the commutator to controllably provide electric current to the armature winding via the commutator. The electric motor further includes an inductor (e.g., a wire-wound inductor) electrically connected in a series relationship with at least one of the brushes and a thermal cutoff device electrically connected in a series relationship with the inductor. The thermal cutoff device is disposed within at least a portion of the inductor.

Other features and embodiments of the invention will become apparent by consideration of the detailed description and accompanying drawings.

BRIEF DESCRIPTION OF DRAWINGS

FIG. 1 is a perspective view of a partially disassembled electric motor capable of incorporating the invention.

FIG. 2 is a view of a first side of a first embodiment of a brush carrier used with the electric motor of FIG. 1.

FIG. 3 is a view of a second side of the brush carrier shown in FIG. 2.

FIG. 4 is a view of a first side of a second embodiment of a brush carrier used with the electric motor of FIG. 1.

FIG. 5 is a view of a second side of the brush carrier shown in FIG. 4.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of including, comprising, or having and variations thereof herein is meant to encompass the items listed thereafter and equivalents thereof as well as additional items. Unless limited otherwise, the terms connected, coupled, and mounted and variations thereof herein are used broadly and encompass direct and indirect connections, couplings, and mountings. In addition, the terms connected and coupled and variations thereof are not restricted to physical or mechanical connections or couplings.

A portion of a disassembled motor 100 (also referred to as a machine) capable of incorporating the invention is shown in FIG. 1. As shown in FIG. 1, the motor 100 includes a housing (or frame) 105, one or more bearings 110, a stator 115, and an armature 120.

For the embodiment shown in FIG. 1, the housing 105 includes one or more covers 125 coupled to a main body portion 130. The one or more bearings 110 are coupled to the housing 105 and support a shaft 135 (discussed below) of the armature 120. For bearing 110, the bearing 110 includes an inner raceway 140, an outer raceway 145, and a plurality of balls or rollers that rotate freely between the inner and outer raceways 140 and 145.

The stator is broadly defined herein to include the portion of the motor having and supporting the stationary magnetic circuit parts. For the embodiment shown in FIG. 1, the stator 115 includes a plurality of permanent magnets 150 coupled to the main body portion of the housing. The permanent magnets 150 are equally spaced around an axis A and are in radial alignment with a portion of the armature 120. Each permanent magnet 150 produces a respective magnetic field.

The term armature is broadly defined herein to mean the rotating member of the motor, including the shaft of the motor. The shaft 135 abuts the inner raceway 140 of the one or more bearings 110, which allow the armature 120 to rotate about the axis A. For the embodiment shown in FIG. 1, the armature 120 includes a plurality of electrically conductive coils 155 (also referred to as armature windings) disposed on a structure 160 (e.g., an armature core). The armature 120 also includes a commutator 165 connected to the conductive coils 155.

The commutator 165 includes an assembly of conducting members 170 insulated from one another and connected to the conductive coils 155. A plurality of brushes (discussed further below) are disposed to freely engage with the conducting members 170 to controllably provide an electric current to the conducting members 170 and the conductive coils 155. As is well known, the electric current within the conductive coils 155 produces magnetic fields that interact with the magnetic fields of the permanent magnets 150. The interaction of the magnetic fields result in the armature 120 rotating about the axis A.

The shaft 135 extends from the housing to provide mechanical power. For example, a fan blade can be attached to the shaft 135, such that the shaft turns the blade to provide fluid/air movement. However, the motor 100 can be used for other purposes.

The motor 100 discussed thus far is a conventional radial air-gap brush motor. While one embodiment of a brush motor capable of incorporating the invention is show in FIG. 1, other types of brush motors (e.g., axial air-gap motors, outer-rotor motors, nonconventional radial air-gap motors, etc.) can incorporate the invention. However, the description below will be in reference to the brush motor 100 shown in FIG. 1.

The motor 100 further includes a brush carrier coupled to the housing. Two embodiments of a brush carrier 200 and 400 are shown in FIGS. 2–3 and 4–5. The brush carrier 200; 400, which can be a brush card, includes a substantially annular base 205; 405 (also referred to as a brush plate) positioned near the conducting members 170 of the commutator 165. The brush carrier 205; 405 includes a plurality of brush holders 210–225; 410–425 coupled to the annular base 210; 410. Each brush holder 210–225; 410–425 surrounds a respective brush 230–245; 430–445. The brush holders 230–245; 430–445 can be one of many shapes including wedge, polygon, and curvilinear shapes, for example.

The brush carrier 200; 400 further includes at least one thermal cutoff device and inductor assembly 250; 450 coupled to the annular base 205; 405. As used herein, the term thermal cutoff device and inductor assembly is broadly construed to mean an assembly comprising a thermal cutoff device 260; 460 and an inductor 270; 470. The thermal cutoff device and inductor assembly 250; 450 (hereinafter TCO-inductor assembly) can include other components (e.g., capacitors, resistors, etc.). The term inductor means any device specifically designed to introduce inductance into an electric circuit. The term thermal cutoff device means any device that creates an open circuit upon sensing a defined or set thermal condition.

For the embodiments shown in FIGS. 2–5, the inductors 270 and 470 (also referred to as chokes) are wire wound inductors with the inductor cores (or choke cores) removed. In place of the cores are the TCO devices 260 and 460. That is, the wire wound inductors 270 and 470 surround at least a portion of the TCO devices 260 and 460, respectively. However, other inductor types and other arrangements for the TCO-inductor assemblies 250; 450 are possible.

For the embodiment shown in FIGS. 2 and 3, the TCO-inductor assembly 250 includes an inductor wire 270 having a 2 mm diameter and being wound 10–11 turns, and the TCO device 260 is a Microtemp® brand thermal cutoff device, model no. G4A00216C, offered by Thermodisc®. For the embodiment shown in FIGS. 4 and 5, the TCO-inductor assembly 450 includes an inductor wire 470 having a 1.3 mm diameter (16 AWG) and being wound 16–17 turns, and the TCO device 460 is a Microtemp® brand thermal cutoff device, model no. G4A00216C, offered by Thermodisc®. However, other characteristics for the wire-wound inductors 270; 470 and other TCO devices 260; 460 can be used.

The brush carrier 200; 400 further includes a plurality of terminals 280–285; 480–490 that are exposed and accessible from the outside of the motor 100. The terminals 280–285; 480–490 receive the electric current. For the embodiment shown in FIGS. 2 and 3, the brush carrier 200 includes two terminals 280 and 285 and, for the embodiment shown in FIGS. 4 and 5, the brush carrier 400 includes three terminals 480, 485, and 490.

The brush carrier 200; 400 further includes conductors 295; 495 that conduct electric current between the plurality of terminals 280–285; 480–490, the plurality of brush holders 230–245; 430–445, and the one or more TCO-inductor assemblies 250; 450. For the embodiments shown, the conductors 295; are bus bars. However, for other embodiments, the conductors can be wires.

The brush carrier 200; 400 can further include other circuitry elements connected in circuit with the one or more TCO-inductor assemblies 250; 450. For example, the brush carrier can include one or more inductors connected in a series relationship with the one or more TCO-inductor assemblies 250; 450.

As will be discussed in more detail below, the one or more TCO-inductor assemblies 250; 450 are connected in circuit such that, when the one or more TCO devices 260; 460 trip, the one or more TCO devices 260; 460 prevent the flow of electric current through the motor 100. For example and with reference to the embodiment shown in FIGS. 2 and 3, the TCO-inductor assembly 250 is wired in circuit to prevent the flow of electric current through the motor 100 when the TCO device 260 trips.

Referring further to the embodiment shown in FIGS. 2 and 3, the brush carrier 200 includes two terminals 280 and 285, four brushes 230, 235, 240, and 245, and one TCO-inductor assembly 250, all of which are arranged in an electric circuit by the bus bars 295. The brush carrier 200 provides DC current to a four-pole motor. An example brush motor capable of being used with the embodiment shown in FIGS. 2 and 3 is a motor sold by Robert Bosch Corporation (USA) having model no. 9000 027 046 or F00HX6B003. Referring to the embodiment shown in FIGS. 4 and 5, the brush carrier 400 includes three terminals 480, 485, and 490, four brushes 430, 435, 440, and 445, and two TCO-inductor assemblies 450, all of which are arranged in an electric circuit by the bus bars 495. The brush carrier 400 provides DC current to a four-pole motor. An example brush motor capable of being used with the embodiment shown in FIGS. 4 and 5 is a motor sold by Robert Bosch Corporation (USA) having model no. F00HX2B007.

Operation of the invention will now be discussed in connection with the embodiment shown in FIGS. 2 and 3. In operation, DC current is provided to the terminals 280 and 285. Following the current path from the positive terminal 280, the DC current flows through bus bar 295A to the TCO-inductor assembly 250. The DC current then flows through the TCO-inductor assembly 250 to bus bar 295B. Bus bar 295B provides the DC current to brushes 230 and 240. The brushes 230 and 240 frictionally engage the commutator 165, thereby providing the DC current to the armature 120. The DC current flows through the armature 120, creating magnetic fields. The magnetic fields of the armature 120 interact with the magnetic fields of the permanent magnets 150, thereby causing the armature 120 to rotate. The DC current returns from the commutator 165 to brushes 235 and 245, which are electrically connected to bus bar 295C and the negative terminal 285.

During operation, the inductor 270 provides basic filtering for the DC current supplied to the motor 100. More specifically, the inductor 270 by itself, in combination with the TCO device 260, and/or in combination with a capacitor (not shown) filters the DC current to help remove noise from the DC current.

Additionally, the inductor 270 promotes the thermal responsiveness of the TCO device 260. More specifically and in some embodiments, it is preferred to have the TCO device 260 be stationary. For embodiments where the TCO device 260 is placed on the brush carrier 200, the TCO device 260 may not be sensitive enough to sense a tripping condition with only the thermal energy generated by the armature 120. By placing the TCO device 260 within at least a portion of the inductor 270, the inductor 270 can help promote the amount of thermal energy sensed by the TCO device 260 and more accurately sense an overheat condition. For the specific example where the inductor wire has a 2 mm diameter and is wound 10–11 turns, and the TCO device is a Microtemp® brand thermal cutoff, model no. G4A00216C, the TCO-inductor assembly 250 can be designed to not nuisance trip at motor voltages as high as 16.0V and at temperatures as high as 110 degrees Celsius, and prevent a thermal event of the motor at conditions such that motor voltage could reach as low as 9.0V and temperature as low as −40 degrees Celsius.

In some embodiments, the TCO-inductor assembly 250 provides one-shot protection. That is, once the TCO device 260 trips, the TCO-inductor assembly 250 (and specifically the TCO device 260) needs to be replaced or the motor discarded. More specifically and in some environments, the occurrence of a tripping event may be extremely rare. It may be more cost effective to have a motor with one-shot protection, where the motor is discarded, than designing the motor with the capability to reset the TCO device.

For a specific example, a motor 100 including the invention can be used as a fan for a cooling system of an automobile. While highly improbable, the fan may stall resulting in an increased current. As a result of the increased current, the inductor 270 (and the armature 120) radiates larger than normal thermal energy. When the amount of thermal energy passes a designed parameter, the TCO-device 260 trips and prevents further DC current from flowing through the motor 100. The controller for the automobile can sense the deactivation of the fan and inform the driver. The driver can then have the vehicle serviced, where the technician can replace the motor.

Thus, the invention provides, among other things, a new and useful electric motor. Various features and advantages of the invention are set forth in the following claims.

What is claimed is:

1. An electric motor comprising:

an armature including an armature winding and a commutator connected to the armature winding;

a stator disposed to magnetically interact with the armature;

a plurality of brushes disposed to engage with the commutator to controllably provide electric current to the armature winding via the commutator;

an inductor electrically connected in a series relationship with at least one of the plurality of brushes;

a thermal cutoff device electrically connected in a series relationship with the inductor and the at least one of the plurality of brushes, the thermal cutoff device being disposed within at least a portion of the inductor; and wherein the inductor is a wire wound inductor having a hollow chamber, and wherein the thermal cutoff device is disposed within at least a portion of the hollow chamber.

2. An electric motor as set forth in claim 1 wherein the motor further comprises a brush carrier and wherein the plurality of brushes, the inductor, and the thermal cutoff device are disposed on the brush carrier.

3. An electric motor as set forth in claim 1 wherein the inductor is configured to provide noise suppression for a current flowing through the inductor.

4. An electric motor as set forth in claim 1 wherein the thermal cutoff device detects thermal energy produced by the armature.

5. An electric motor as set forth in claim 1 wherein the thermal cutoff device detects thermal energy produced by the inductor.

6. An electric motor as set forth in claim 1 wherein the thermal cutoff device is a one-shot protection thermal cutoff device.

7. An electric motor as set forth in claim 1 wherein the thermal cutoff device provides open circuit protection when the inductor senses a temperature greater than a temperature that could potentially generate irreversible damage to the motor.

8. An electric motor as set forth in claim 1 and further comprising:

a second inductor electrically connected in a series relationship with a second at least one of the plurality of brushes;

a second thermal cutoff device electrically connected in a series relationship with the second inductor and the second at least one of the plurality of brushes, the thermal cutoff device being disposed within at least a portion of the second inductor; and wherein the second inductor is a second wire wound inductor having a second hollow chamber, and wherein the second thermal cutoff device is disposed within at least a portion of the second hollow chamber.

9. An electric motor comprising:

an armature including an armature winding a commutator connected to the armature winding;

a stator disposed to magnetically interact with the armature; and a brush carrier including a plurality of brushes disposed to frictionally engage with the commutator to controllably provide electric current to the armature winding via the commutator;

a wire-wound inductor having a hollow chamber and being electrically connected in a series relationship with the at least one of the plurality of brushes, the inductor providing noise suppression to the current flowing through the inductor; and a thermal cutoff device electrically connected in a series relationship with the inductor and with the at least one of the plurality of brushes, the thermal cutoff device being disposed within at least a portion of the hollow chamber of the inductor.

10. An electric motor as set forth in claim 9 wherein the thermal cutoff device detects thermal energy produced by the armature.

11. An electric motor as set forth in claim 9 wherein the thermal cutoff device detects thermal energy produced by the inductor.

12. An electric motor as set forth in claim 9 wherein the thermal cutoff device is a one-shot protection thermal cutoff device.

13. An electric motor as set forth in claim 9 wherein the thermal cutoff device provides open circuit protection when the inductor senses a temperature greater than 110 degrees Celsius.

14. An electric motor comprising:

an armature including an armature winding and a commutator connected to the armature winding;

a stator disposed to magnetically interact with the armature;

a brush carrier including a plurality of brushes disposed to frictionally engage with the commutator to provide electric current to the armature winding via the commutator;

a wire-wound inductor having a hollow chamber and being electrically connected in a series relationship with at least one of the plurality of brushes, the inductor providing noise suppression to the current flowing through the inductor; and a thermal cutoff device electrically connected in a series relationship with the inductor and with the at least one of the plurality of brushes, the thermal cutoff device being disposed within at least a portion of the hollow chamber of the inductor, thereby detecting thermal energy produced by the armature and the inductor.

15. An electric motor comprising:
- an armature including an armature winding and a commutator connected to the armature winding;
- a stator disposed to magnetically interact with the armature;
- a plurality of brushes disposed to engage with the commutator to controllably provide electric current to the armature winding via the commutator;
- a first inductor electrically connected in a series relationship with a first at least one of the plurality of brushes;
- a first thermal cutoff device electrically connected in a series relationship with the first inductor and the first at least one of the plurality of brushes, the first thermal cutoff device being disposed within at least a portion of the first inductor;
- a second inductor electrically connected in a series relationship with a second at least one of the plurality of brushes; and
- a second thermal cutoff device electrically connected in a series relationship with the second inductor and the second at least one of the plurality of brushes, the second thermal cutoff device being disposed within at least a portion of the first inductor.

16. An electric motor as set forth in claim 15 wherein the motor further comprises a brush carrier and wherein the plurality of brushes, the first and second inductors, and the first and second thermal cutoff devices are disposed on the brush carrier.

17. An electric motor as set forth in claim 15 wherein the inductor is configured to provide noise suppression for a current flowing through the inductor.

18. An electric motor as set forth in claim 15 wherein the thermal cutoff device detects thermal energy produced by the armature.

19. An electric motor as set forth in claim 15 wherein the thermal cutoff device detects thermal produced by the inductor.

20. An electric motor as set forth in claim 15 wherein the thermal cutoff device is a one-shot protection thermal cutoff device.

21. An electric motor as set forth in claim 15 wherein the thermal cutoff device provides open circuit protection when the inductor senses a temperature greater than a temperature that could potentially generate irreversible damage to the motor.

* * * * *